L. COLLINS.
Cartridges for Exterminating Burrowing Animals.
No. 155,424. Patented Sept. 29, 1874.
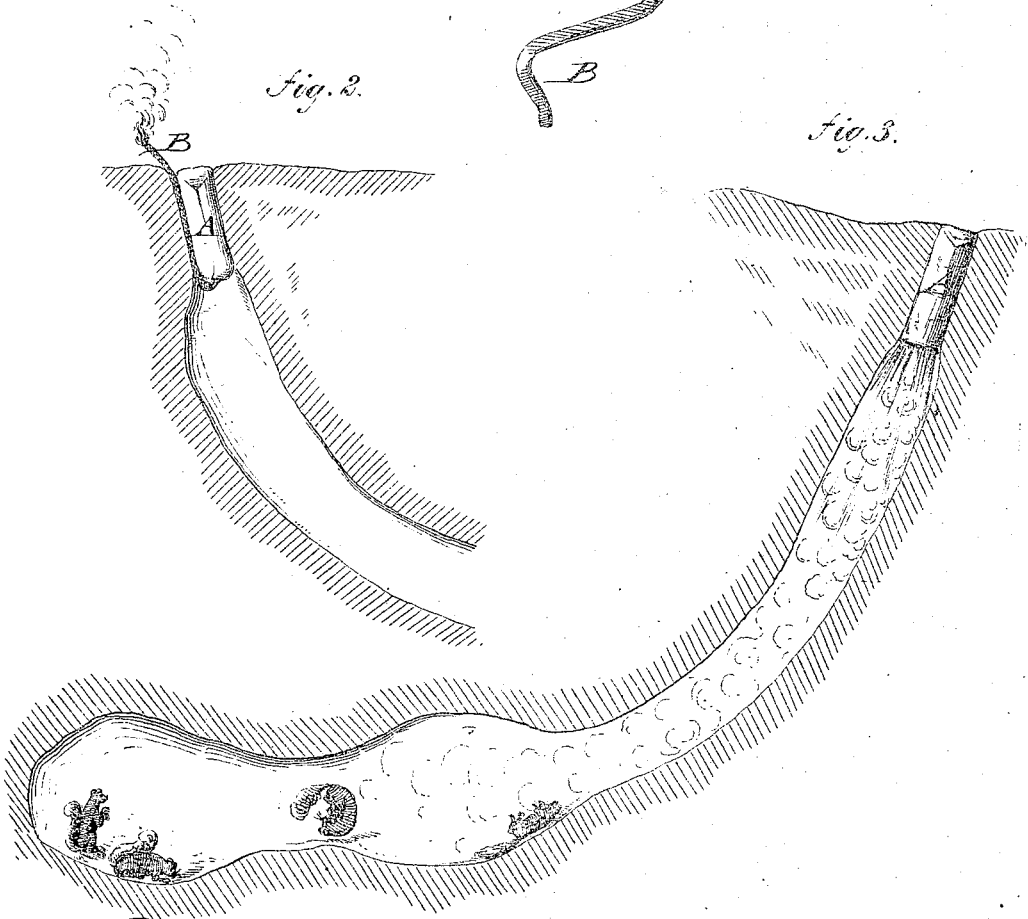

UNITED STATES PATENT OFFICE.

LYSANDER COLLINS, OF ALMA, CALIFORNIA.

IMPROVEMENT IN CARTRIDGES FOR EXTERMINATING BURROWING ANIMALS.

Specification forming part of Letters Patent No. 155,424, dated September 29, 1874; application filed August 22, 1874.

*To all whom it may concern:*

Be it known that I, LYSANDER COLLINS, of Alma, Santa Clara county, California, have invented a new and Improved Cartridge for Exterminating Squirrels, &c., of which the following is a specification:

In the drawing, Figure 1 represents a side elevation of my improved cartridge for the extermination of squirrels, gophers, &c.; and Figs. 2 and 3 show the application of the cartridge to the squirrel-holes.

Similar letters of reference indicate corresponding parts.

My invention relates to a cartridge for exterminating squirrels, gophers, and similar vermin, to be used specially in parts of the country in which they are found in large numbers, so as to do considerable damage to the crops. My invention consists of a cartridge of suitable size filled with a slowly-burning mixture of blasting-powder and sulphur, and provided with a suitable fuse extending from the point of the cartridge along the body of the same for being ignited from the front end, and throwing the sulphur-fumes in forward direction.

In the drawing, A represents a cartridge of suitable size and material, which is filled with a mixture of blasting-powder and sulphur prepared by moistening the powder and mixing it to the consistency of thick paste, adding then one pound of sulphur to five pounds of powder. This causes a slow burning of the mass without explosion, and also the throwing forward of the sulphur-fumes by the less violent combustion of the powder. A fuse, B, is introduced at the front end or point of the cartridge, and a small quantity of rifle-powder is placed around the end of the same for producing the ignition of the pasty mixture. In front of the rifle-powder a small quantity of sulphur may be placed, so that immediately on the ignition of the powder the sulphur is ignited and thrown forward by the explosion. The cartridge A is then securely wrapped up and a sufficient length of the fuse B allowed to remain, so that it may pass along the cartridge beyond its end or rear part. The cartridge is placed tightly in the squirrel, gopher, or other hole, and the fuse then set on fire. The cartridge is ignited by the fuse at the front end, and forces, by the action of the slowly exploding or burning powder, the sulphurous fumes in forward direction into the hole, destroying every animal in the same. These cartridges, therefore, give to the farmer a very convenient and readily-applied device for exterminating animals which burrow in the ground, whenever their number has increased to such an extent that considerable damage is done by them to the crops.

Having thus described my invention, I claim, as new and desire to secure by Letters Patent—

A cartridge for exterminating squirrels, gophers, and similar animals, filled with a slow-burning mixture of blasting-powder and sulphur, and ignited by a fuse applied to the front end and extended back along the cartridge, substantially as and for the purpose set forth.

LYSANDER COLLINS.

Witnesses:
E. H. EVANS,
R. H. DUNCAN.